No. 626,225. Patented June 6, 1899.
W. DOUGLAS.
REIN AND DRAW ROPE ATTACHMENT FOR PLANTERS.
(Application filed Oct. 24, 1898.)
(No Model.)
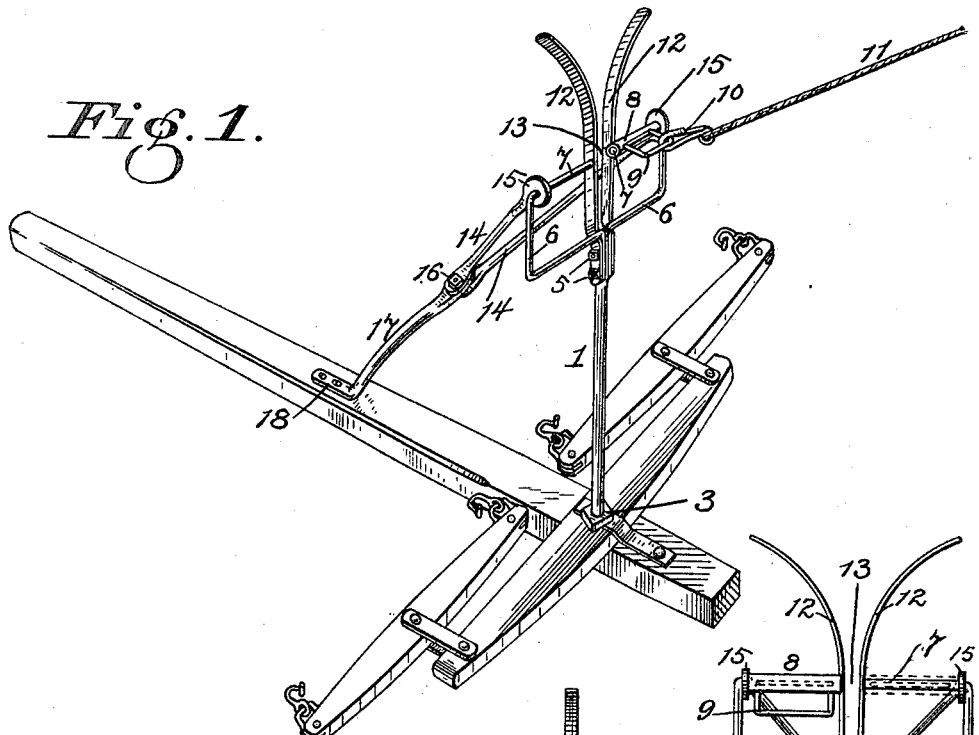
Fig. 1.
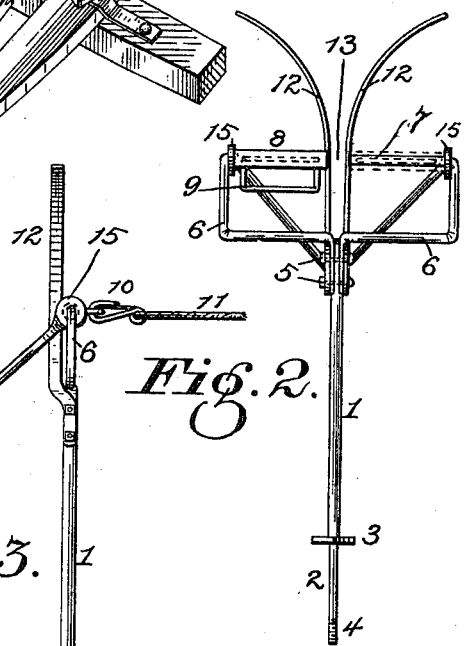
Fig. 2.
Fig. 4.
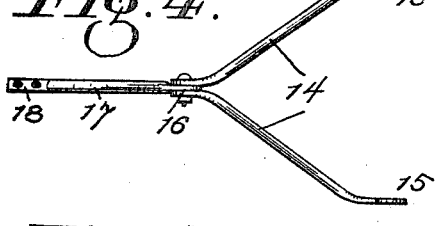
Fig. 3.
Fig. 5.
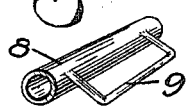
WITNESSES:
Geo. H. Hollis
Geo. Morton
INVENTOR:
William Douglas,
BY
Frank M. Burnham.
ATTORNEY.

UNITED STATES PATENT OFFICE.

WILLIAM DOUGLAS, OF FLETCHER, OHIO.

REIN AND DRAW-ROPE ATTACHMENT FOR PLANTERS.

SPECIFICATION forming part of Letters Patent No. 626,225, dated June 6, 1899.

Application filed October 24, 1898. Serial No. 694,432. (No model.)

*To all whom it may concern:*

Be it known that I, WILLIAM DOUGLAS, a citizen of the United States, residing at Fletcher, in the county of Miami and State of Ohio, have invented certain new and useful Improvements in Rein and Draw-Rope Attachments for Planters; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a rein and draw-rope attachment for planters or a combination device for supporting the reins and controlling the movements of the draw-rope of any ordinary form of land-marker employing a long swinging marker arm or shaft provided at its end with a marking attachment or marker adapted to swing or oscillate back of the driver's seat at the rear of the planter whenever the driver or operator desires to throw or swing the marker from one side of the planter over to the other, and although susceptible of being used on any class of planters where a land-marker is used (by reason of its upright standard passing through the eye of the hammer-strap, doubletree, and tongue in place of the ordinary coupling-pin or king-bolt and the foot of the curved standard or arm being firmly screwed or otherwise connected to the pole or tongue) is more especially designed for use on corn-planters; and it consists in certain novel features of construction and new combination of parts, as will be fully described hereinafter and pointed out in the subjoined claims, in accordance with the statute in such cases made and provided therefor.

The objects of my invention are to so construct a simple and cheaply-manufactured device that may be readily and quickly attached to or detached from the doubletree and tongue of any class of planters and used in connection with land-markers of almost any form in such a manner as to obviate the hardship and laborious effort on the part of the driver in being forced every time he throws his marker-arm and marker from one side to the other of the planter to stop his horses, dismount, and untie the end of the draw-rope from the singletree (or wherever it may be attached) and retie it to the singletree on the opposite side of the planter or that side upon which the marker-arm and marker have been thrown.

Referring to the accompanying drawings, illustrating my invention and in which similar numerals of reference indicate like parts throughout the several views, Figure 1 is a perspective view of my rein and draw-rope attachment as applied in operative position to a planter-tongue and doubletree. Fig. 2 is a rear view of my rein and draw-rope attachment. Fig. 3 is a side elevation of the same. Fig. 4 is a plan view of the curved supporting-standard and side braces; and Fig. 5 is an enlarged perspective view in detail of the sliding sleeve, to the bail of which is attached the snap-hook of the draw-rope.

In the several views of the accompanying drawings, as aforesaid, the numeral 1 indicates an upright standard of suitable thickness to give it sufficient strength and terminating at its lower end in a stem or pin 2 and a nut or stationary collar 3. Said stem or pin 2 is somewhat smaller in circumference than standard 1 and of the proper size and length so as to pass entirely through the bolt-eye of the hammer-strap, doubletree, and tongue of the planter and has its end screw-threaded, as at 4, so that, if desired, a nut may be used, although I have found that this is not necessary, as the collar 3, being made sufficiently large and strong and preferably formed integral with its upright standard 1, will rest and bear firmly and solidly upon the hammer-strap, (especially as the curved standard in front has its foot rigidly attached by screws or small bolts to the tongue, as will be fully described hereinafter.)

Connected one on each side to the upper end of the upright standard 1 by small bolts 5 are the arms 6, which together form a frame somewhat rectangular in form, the upper portions of which form the guide-rods 7, which carry and upon which play back and forward the sliding sleeve 8, which is provided with a bail 9, to which is attached the snap 10, securely fastened to the end of the draw-rope 11 of the marker, (not necessary to be here shown.) The two sections 12 are also connected one on each side of the upright standard 1 and are held firmly in position by the bolts and nuts 5, the said sections 12 being of a curved form, so that together they will form the forked or bifurcated rein-slide, in which the reins by which the horses or animals are driven are dropped and supported whenever the driver wishes the free use of his hands or desires to throw the marker-arm and marker from one side of the planter to the other when a new row is started.

It will be here observed that the guide-rods 7 (of the arms 6 of the frame) do not come quite together in front and a space 13, which is just the width of the space between the curved arms 12 of the rein-slide, is left for the purpose of allowing the reins to drop below and out of the way of the sliding sleeve 8 when it passes or plays from one of the guide-rods 7 over to the other, so as to be on the side of the planter the driver or operator throws or shifts the marker-arm and marker to when necessary to make his turn and start a new row.

The two side braces or arms 14 terminate at their upper ends in flat eyes 15, through which passes guide-rods 7 of the arms 6 of the rectangular frame, and meet at their lower ends and are there pivoted by a small bolt, as indicated at 16, to the upper end of the curved standard or arm 17, said standard or arm being bent or formed at its lower end with a foot 18, adapted to be firmly secured to the tongue by screws or small bolts. Said side braces or arms, together with the curved standard, help to firmly brace the entire device and hold it in its proper upright position no matter how strong the side draft from the draw-rope may be.

It will of course be understood that when the marker-arm is swung or thrown from one side of the planter to the other, its length being such that as it rises the draw-rope, being tied to the marker, will swing high enough to pass clear of the driver's head in the usual manner and that by reason of the pivotal or hinged joint 16 and flat eyes 15 the entire device when not in use or attached to the doubletree and tongue may be folded up in a convenient form for transportation.

I do not limit myself to the exact style or form of construction of the several parts of my rein and draw-rope attachment, as they may be somewhat varied without departing from the spirit or principles of my invention; but

What I claim as my invention, and desire to secure by Letters Patent, is—

1. In a rein and draw-rope attachment for planters; an upright standard; a bifurcated rein slide or supporter, a frame carrying a sleeve; in combination with side arms or braces and a curved standard, all substantially as specified.

2. In a device for controlling the movement of the draw-rope of a land-marker, the combination of an upright support formed with a stem or pin, a collar or nut and provided with a bifurcated or forked portion; a frame portion formed with guide-rods; a sliding sleeve provided with a bail or loop; side braces formed with eyes; and a curved arm provided with a foot; all substantially as set forth.

In testimony whereof I affix my signature in presence of two witnesses.

WILLIAM DOUGLAS.

Witnesses:
C. F. GROSVENOR,
E. S. DAVY.